United States Patent [19]

Hsieh et al.

[11] 4,341,672

[45] Jul. 27, 1982

[54] SULFUR OR PEROXY CURED EPOXIDIZED DIENE RUBBERS

[75] Inventors: Henry L. Hsieh, Bartlesville, Okla.; Kishore Udipi, East Longmeadow, Mass.

[73] Assignee: Phillips Petroleum Company, Bartlesville, Okla.

[21] Appl. No.: 188,659

[22] Filed: Sep. 19, 1980

Related U.S. Application Data

[63] Continuation of Ser. No. 862,066, Dec. 19, 1977, abandoned, which is a continuation of Ser. No. 661,082, Feb. 25, 1976, abandoned.

[51] Int. Cl.³ .................................................... C08L 15/00
[52] U.S. Cl. .................................... 523/451; 260/756; 525/333; 525/334; 525/354; 525/387; 523/456; 523/400

[58] Field of Search .......... 260/42.28, 23.7 M, 28.5 B, 260/33.6 AQ, 756, 42.21; 525/333, 334, 354, 387

[56] References Cited

U.S. PATENT DOCUMENTS

| | | | |
|---|---|---|---|
| 3,092,608 | 6/1963 | Reich et al. | 525/333 |
| 3,175,997 | 3/1965 | Hsieh | 525/334 |
| 3,269,978 | 8/1966 | Short et al. | 525/334 |
| 3,310,523 | 3/1967 | Lenas | 260/42.28 |
| 3,392,045 | 7/1968 | Holub | 260/42.28 |
| 3,405,086 | 10/1968 | Schaafsma | 260/18 EP |
| 4,051,199 | 9/1977 | Udipi et al. | 526/56 |
| 4,107,134 | 8/1978 | Dawans | 260/42.28 |

FOREIGN PATENT DOCUMENTS 414273  6/1974  U.S.S.R. .............................. 525/354

*Primary Examiner*—James H. Derrington

[57] ABSTRACT

Sulfur or peroxy cured compositions prepared from epoxidized diene rubbers.

25 Claims, No Drawings

SULFUR OR PEROXY CURED EPOXIDIZED DIENE RUBBERS

This is a continuation of Ser. No. 862,066 filed Dec. 19, 1977, now abandoned; which is a continuation of Ser. No. 661,082 filed Feb. 25, 1976 and now abandoned.

FIELD OF THE INVENTION

The invention relates to sulfur or peroxy cured rubbery diene polymers. In another aspect, the invention relates to methods to improve the wet skid resistance to rubbery diene polymers.

BACKGROUND OF THE INVENTION

Rubbers which have been used in the manufacture of such as tire tread compositions include natural rubber and various synthetic polymers such as polyisoprene, butyl rubber, polybutadiene, styrene/butadiene copolymers, ethylene/propylene/diene terpolymers, and others, alone or in various admixtures. Blends of chlorinated butyl rubber or isobutylene/cyclopentadiene copolymer, with styrene/butadiene copolymer and polybutadiene have been suggested for tire tread compositions to improve wet skid resistance, particularly for pneumatic tires.

When discussing wet skid resistance, the commonly considered application is that of automobile and truck tires. However, the necessity for avoiding a slippery condition when the rubber surface is wet is necessary in a wide range of cured rubber compositions, not only automobile and truck tires, but such as rubber stair treads, rubber walkways, rubber mats, rubber belting for machinery, rubber heels for shoes, and the like. One of the known hazards of many of these utility surfaces is the fact that when the rubber surface is wet with water, it becomes relatively slippery, and hazardous to the user. Of course, for tires in particular, the increasing traffic population has imposed many safety requirements, and necessitated improved automobile handling characteristics even under adverse conditions. Improved wet skid resistance can be a sizeable factor in avoiding at least some of the injuries and deaths which are a consequence of the American love for the automobile.

BRIEF SUMMARY OF THE INVENTION

We have discovered that the sulfur or peroxy cured compositions prepared from epoxidized diene rubbers exhibit remarkably increased wet skid resistance. These compositions can be suitably employed for a variety of skid-resistant applications, particularly such as tires for automotive purposes.

DETAILED DESCRIPTION OF THE INVENTION

Our employment of the term "diene rubber" is intended to be a broad usage of the term to include any rubber whose structure is based on a conjugated diene, whether a natural rubber, or a synthetic rubber prepared by such as the well known emulsion or solution processes.

These diene rubbers can be composed of or prepared from one or more conjugated dienes, alone, or in combination with a copolymerizable monomer such as a monovinylarene or other comonomer, so long as the resulting polymer exhibits rubbery or elastomeric characteristics.

Of the various synthetic diene rubbers, presently preferred are the solution-polymerized diene rubbers because of their compositional uniformity, ease of preparation, ease of fabrication, ease of preparation of copolymers or polymers with molecular weight ranges particularly suitable for the epoxidation step in accordance with our invention to extents beneficial to wet skid resistance.

The synthetic diene rubbers can be simple homopolymers such as polybutadiene or polyisoprene; or can be linear containing two or more blocks of polymer derived from the same or different monomers; can be coupled or uncoupled, or radial; and the polymer structure can be random or block or mixed. Rubbery graft copolymers also are appropriate as are other rubbery types suitable generally for rubber traction surfaces including application of tires. Multiblock structure can arise by various types of coupling such as dichain coupling, coupling with multifunctional treating agents, various modes of preparation such as sequential monomer addition, or other techniques well known in the art.

Presently preferred are rubbery diene polymers exhibiting, before curing, molecular weights in the range of about 50,000 to 500,000, preferably about 75,000 to 300,000 for ease of handling, including during the epoxidation stage and subsequent processing and fabrication.

Aside from the natural rubber which we include as a "diene rubber", the diene rubbers can be prepared from polymerizable conjugated dienes, generally those in the range of 4 to 12 carbon atoms per molecule for convenience and availability, with those containing 4 to 8 carbon atoms being preferred for commercial purposes, most preferred for the diene rubbers are butadiene and isoprene because of their known highly desirable characteristics and availability. Examples include 1,3-butadiene and isoprene, as well as 2,3-dimethyl-1,3-butadiene, piperylene, 3-butyl-1,3-octadiene, 2-phenyl-1,3-butadiene, and the like, alone or in admixture. As suitable conjugated diene feedstocks for polymerization products, particularly in the solution polymerization processes, 1,3-butadiene can be employed in admixture with other low molecular weight hydrocarbons, such admixtures being termed low concentration diene streams, obtainable from a variety of refinery product streams such as from naphtha cracking operations and the like and may contain such as 30 to 50 weight percent 1,3-butadiene though this can range widely.

Monovinylarenes which can be employed with the conjugated diene, or block copolymerized in association with the conjugate diene, are those known to polymerize with organoalkali metal initiators in solution polymerization systems, typically containing in the range of 8 to 20 carbon atoms per molecule, more usually 8 to 12 for commercial purposes, and most preferred presently is styrene as the most readily commercially available monomer. Other exemplary species include 1-vinylnaphthalene, 2-vinylnaphthalene, various alkyl, cycloalkyl, aryl, alkaryl and aralkyl derivatives of styrene such as 3-methylstyrene, 4-propylstyrene, 4-cyclohexylstyrene, 4-dodecylstyrene, 2-ethyl-4-benzylstyrene, 4-p-tolystyrene, 4-(4-phenylbutyl)styrene, and the like, alone or in admixture. These monovinylarenes also can have a variety of substituents well known in the art such as alkoxy such as 4-methoxystyrene, amino such as 4-dimethylaminostyrene, and the like.

Particularly presently preferred rubbers are the polybutadienes, polyisoprenes, and butadiene or isoprene styrene copolymers.

Various polar monomers can be polymerized to form block copolymers with conjugated dienes as is known in the art, including such as the vinylpyridines, vinylquinolines, acrylic and alkacrylic acid esters, nitriles, and the like, such as methyl acrylate, ethyl acrylate, methyl methacrylate, ethyl methacrylate, acrylonitrile, and the like. The nitrile rubbers thus are included as one aspect of our invention.

In preparing rubbery diene copolymers, the proportion of the conjugated diene versus the other monomer or monomers should be sufficient so as to result in a substantially rubber or elastomeric copolymer product. There is no sharp break point as to the amount of conjugated diene versus other comonomer such as to confer rubbery or elastomeric properties on the resulting copolymer, though in general at least about 50 parts by weight of conjugated diene are required on an exemplary basis.

The diene polymers can be prepared by means well known in the art including bulk polymerization, emulsion polymerization, such as with one of the free radical generating initiators, combination processes of part polymerization with bulk followed by conversion to emulsion processes or suspension polymerization, and the like. As mentioned hereinabove, particularly preferred for convenience of handling and ease of handling in the subsequent epoxidation step are solution polymerization procedures employing the hydrocarbyl alkali metal initiator such as the hydrocarbyllithium initiators which presently are most commercially preferred. These lithium initiators, such as n-butyllithium, are well known in the art. Where a rubbery random copolymer is desired, various types of randomizing agents such as tetrahydrofuran, or potassium t-amyloxide can be employed. Modification of polymer microstructure, control of vinyl, can be obtained with such as tetrahydrofuran. Polymerization conditions themselves are well known in the art and bear no need for repetition here as far as temperatures, pressures, times, and the like, being well known.

The rubbery diene polymer, prior to compounding and curing, in accordance with our invention is epoxidized. Epoxidation can be effected by the use of epoxidizing agents such as a peracid such as m-chloroperbenzoic acid, peracetic acid, or with hydrogen peroxide in the presence of a carboxylic acid such as acetic acid or formic acid with or without a catalyst such as sulfuric acid. Carboxylic anhydrides can be employed as alternatives to the corresponding carboxylic acids. For example, acetic anhydride can be used in place of acetic acid. The use of the anhydride has the effective result of providing a higher concentration of peracid formed in situ than would be the case if the corresponding carboxylic acid had been employed. Other acids and acidic agents can be employed in place of the aforementioned sulfuric acid, e.g., p-toluenesulfonic acid or a cationic exchange resin such as a sulfonated polystyrene.

Epoxidation is conducted employing a solvent capable of substantially dissolving the diene rubbers in their original condition as well as after being epoxidized. Suitable solvents are generally aromatic solvents such as benzene, toluene, xylenes, chlorobenzene, as well as cycloaliphatic such as cyclohexane, and the like.

Epoxidation should be conducted at a temperature in the range of about 0° to 150° C., presently preferred about 25° to 80° C., because of useful reaction rate with a minimum of side-reactions, employing a time sufficient to achieve the degree of epoxidation desired which is that degree sufficient to markedly improve the wet skid resistance of the ultimately cured composition. Exemplary times are in the range of about 0.25 to 10 hours, presently preferred as being generally satisfactory and convenient at about 0.5 to 3 hours. Higher reaction temperatures generally mean shorter reaction times being needed, and where it is more convenient to employ lower temperatures, then usually a somewhat longer epoxidation time should be practiced.

The concentration of active epoxidizing agents presently exemplarily can be in the range of about 1 to 100 weight percent relative to the weight of polymer to be epoxidized, presently preferred about 4 to 30 weight percent relative to the weight of polymer.

Presently recommended is an extent of epoxidation, defined as the percentage of originally present olefinically unsaturated sites in the diene rubber which has been converted to oxirane, hydroxyl, and ester groups, about 5 to 95 percent, presently preferred about 10 to 50 percent.

Subsequent to epoxidation, the now epoxidized diene rubber can be isolated by removal of the acidic catalyst through filtration, or by adding dilute aqueous base to neutralize soluble acidic catalyst components, followed by coagulation of the polymer such as with a low alcohol such as methanol or one of the propyl alcohols, decantation to collect the coagulum, one or more redissolution and recoagulation cycles for purification, inclusion of an antioxidant, and final removal of solvent traces at reduced pressure. Alternatively, various other known methods for the recovery of polymers from a hydrocarbon solvent can be employed such as steam stripping and the like.

The epoxidized diene rubbers are admixed with one or more additives such as fillers, pigments, extenders, other polymers, other rubbers, etc., as may be desired.

Exemplary of the additives that can be mixed with the polymers are calcium carbonate, iron oxide, carbon blacks, silica, calcium silicate, alumina, various dyes and pigments, nonreinforcing as well as reinforcing fillers, and various types of stabilizing materials known in the art.

The epoxidized rubbers, with such fillers, extenders, plasticizers, reinforcing agents, as may be desired, ultimately are cured or crosslinked. The curing system can be either a sulfur-system or a peroxy-system. Presently preferred for low-odor and economy is the sulfur curing system. The sulfur cure system comprises sulfur or sulfur-containing compounds such as organic sulfides, organic sulfenamides, and the like, as well as various combinations. Generally, the quantity of sulfur in the free or combined form employed will be in the range of about 0.1 to 5 weight percent based on the rubbery portion of the composition.

Peroxy-based curing systems known in the art to be useful in crosslinking rubbers can be employed, but presently are considered less desirable in this invention due to their high cost and to the sometimes less agreeable odor imparted to the vulcanized stocks by the peroxy systems.

Various primary and secondary accelerators typified by benzothiazyldisulfide or mercaptobenzothiazole or benzothiazyl-2-sulfenomorpholide, can be incorporated. Sensitivity of the vulcanizing system employed to heat, known as the scorch time, will dictate the incorporation method to be used. Generally, any type of commercial blending, Banbury mixer, and the like, can be employed.

A general recipe for tire tread stocks, which tread stocks constitute a particularly desirable aspect of our invention, can include as exemplary constituents and amounts as follows:

| | Tire Tread Stock | |
|---|---|---|
| Constituent | Broad, parts by weight | Preferred, parts by weight |
| Polymer | 100 | |
| Carbon Black | 40–120 | 50–90 |
| Extender Oil | 5–80 | 8–50 |
| Sulfur | 1–3 | f |
| Activator[a] | 1–8 | f |
| Accelerator[b] | 0.5–1.5 | f |
| Secondary accelerator[c] | 0–0.5 | f |
| Antioxidant & antiozonant[d] | .1–3 | |
| Processing aids[e] | 0–5 | |

[a]Zinc oxide, stearic acid, zinc stearate and mixtures thereof are commonly used.
[b]2-mercaptobenzothiazole, N-cyclohexyl-2-benzothiazoyl sulfenamide are commonly used.
[c]Diphenylguanidine, tetramethylthiuram disulfide are commonly used.
[d]Amines such as phenyl-B-naphthylamine, diarylamineketone reaction product, N,N'-diphenyl-p-phenylenediamine, etc., alkylated phenols, such as butylated hydroxytoluene, etc.; phosphites, such as tris(nonylphenyl)phosphite, etc., are commonly used.
[e]Waxes commonly are used.
[f]Preferable amounts of sulfur, accelerator and secondary accelerator are interrelated, depending also on desired properties of vulcanizate.

EXAMPLES

Examples provided are designed to assist in an understanding of our invention, and are not intended to be limitative relative to particular components, relationships, and the amounts, and the like, all of which should be considered in their proper context as exemplary of the scope of our invention.

EXAMPLE I

Portions of a solution-polymerized butadiene/styrene rubber were epoxidized to two different extents of epoxidation in accordance with the following epoxidation recipe.

| EPOXIDATION RECIPE | | |
|---|---|---|
| | | php[a] |
| Polymer[b] | | 100 |
| Toluene | | 866 |
| Dowex 50W-X8[c] | | 23 |
| Acetic anhydride | | variable |
| Hydrogen peroxide, 30% | | variable |
| Temperature, °C. | 70 | |
| Time, hours | 3 | |

[a]Parts by weight per hundred parts polymer.
[b]A solution-polymerized 75/25 1,3-butadiene/styrene rubber initiated by n-butyllithium, randomized by tetrahydrofuran, coupled with stannic chloride, and possessing a Mooney viscosity of 56 (ML-4 at 100° C., ASTM D 1646-63).
[c]A strongly acidic cation exchange resin of sulfonated polystyrene with 8 percent by weight divinylbenzene.

Epoxidation procedure: To a stirred solution of polymer in toluene maintained at 70° C. was added the ion exchange resin followed by the acetic anhydride. Hydrogen peroxide then was added dropwise to the polymer solution with continued stirring. This mixture was stirred and maintained at 70° C. for 3 hours.

The epoxidized polymers were coagulated in isopropyl alcohol and purified by recoagulation in isopropyl alcohol from toluene solution. Prior to the final coagulation, 1 php 2,6-di-t-butyl-4-methylphenol anti-oxidant was added as a 10 wt. percent solution in mixed isopropyl alcohol and toluene. Volatiles were removed at about 50° C. under reduced pressure.

The epoxidized polymers then were compounded in accordance with the following compounding recipe:

| COMPOUNDING RECIPE[a] | |
|---|---|
| | php |
| Epoxidized polymer | 100 |
| International Reference Black No. 4 | 50 |
| Aromatic extender oil | 10 |
| Zinc oxide | 3 |
| Stearic acid | 2 |
| Flexamine[b] | 1 |
| Sulfur | 1.75 |
| Santocure[c] | 1 |

[a]An internal mixer was employed. Mixing times and dump temperatures as shown in Table I. The compounds were cured for 30 minutes at 307° F.
[b]A physical mixture of a diarylamine - ketone reaction product (65 wt. %) and N,N'-diphenyl-p-phenylenediamine (35 wt. %).
[c]N-Cyclohexyl-2-benzothiazolesulfenamide.

The compounded epoxidized rubbery diene polymers then were evaluated with results as summarized in Table I:

TABLE I

| | Control[a] | Run 1 | Run 2 |
|---|---|---|---|
| (CH$_3$CO)$_2$O,[b] php | none | 3.24 | 6.48 |
| 30% H$_2$O$_2$, php | none | 14 | 28 |
| Oxirane, wt. %[c] | none | 1.96 | 3.28 |
| Oxygen, wt. %[d] | none | 3.38 | 5.2 |
| Raw Mooney[e] | 56 | 37 | 56 |
| Dump temp., °F. | 275 | 280 | 280 |
| Mixing time, min. | 6.5 | 14 | 6.5 |
| Compounded Mooney[e] | 74 | 83 | —[f] |
| Tensile strength, psi[g] | 2800 | 3650 | 3350 |
| Elongation, %[g] | 480 | 610 | 370 |
| 300% modulus[g] | 1430 | 1460 | 2520 |
| 200% modulus[g] | 700 | 750 | 1360 |
| Shore A hardness[h] | 59.5 | 61.5 | 65.5 |
| PST values[i] | | | |
| actual | 11.6 | 13.4 | 16.0 |
| relative | 100 | 116 | 138 |

[a]The control was the same polymer stock as epoxidized in Run 1 and Run 2, except non-epoxidized. Otherwise, it was compounded as in Runs 1 and 2.
[b]Acetic anhydride.
[c]Weight in grams of oxirane oxygen per 100 grams of epoxidized polymer, R. R. Jay Anal. Chem. 36, 667–668 (1964).
[d]Determined by activation analysis.
[e]Mooney viscosity, ML-4 at 212° F., ASTM D 1646-63.
[f]Too high to measure.
[g]ASTM D 412-66.
[h]ASTM D 2240-68.
[i]Data from Portable Skid Resistance Tester employing Syenite glass (E. M. Revilacqua and E. P. Percapio, SCIENCE 160, 959–964 (1968). Test specimens were 3 in. × 1 in. × 0.25 in. The relative values reflect percentage improvements in the actual values for Run 1 and Run 2 over the control.

The above data show that very marked improvements in traction or skid resistance occurs as a result of epoxidation prior to compounding. The polymer of Run 2, which was more highly epoxidized than the polymer of Run 1, outperformed the control run by a wider margin than did the polymer of Run 1. Thus the improvement appears relatable to the degree of epoxidation.

The sulfur or peroxy cured epoxidized rubbers exhibit desirable wet-skid resistance in tire tread applications, such as pneumatic automotive tires, as well as in a variety of uses where it is desired to minimize the skid tendencies of a rubber article.

The disclosure, including data, has illustrated the value and effectiveness of our invention. The examples, the knowledge and background of the field of the invention and of general principles of chemistry and other applicable scienes, have formed the bases from which

We claim:

1. A curable rubbery tread composition, exhibiting wet skid resistance when cured, consisting of rubber, filler, extender oil, and a sulfur or peroxy curing system, wherein said rubber is an epoxidized conjugated diene rubber exhibiting a molecular weight in the range of about 50,000 to 500,000 and an extent of epoxidation of about 5 to 95 percent of olefinically unsaturated sites in the conjugated diene rubber prior to curing.

2. The tread composition according to claim 1 wherein said epoxidized diene rubber is a natural or synthetic rubber, and where synthetic is prepared from at least one conjugated diene of 4 to 12 carbon atoms per molecule or from at least one said conjugated diene with at least one monovinylarene comonomer.

3. The tread composition according to claim 2 wherein said epoxidized diene rubber is a synthetic rubber.

4. The tread composition according to claim 3 wherein said diene rubber is a copolymer of at least one conjugated diene with at least one monovinylarene.

5. The tread composition according to claim 4 wherein said monovinylarene is styrene, 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, 4-p-tolyl-styrene, 4-(4-phenylbutyl)styrene, 4-methoxystyrene, or 4-dimethylaminostyrene.

6. The tread composition according to claim 5 wherein said epoxidized diene rubber is characterized as a solution-polymerized butadiene/styrene rubber.

7. The tread composition according to claim 6 wherein said epoxidized butadiene/styrene rubber is prepared by epoxidizing a butadiene/styrene rubbery copolymer with hydrogen peroxide, acetic anhydride, and a cation exchange resin of sulfonated polystyrene with divinylbenzene.

8. The tread composition according to claim 3 wherein said epoxidized diene rubber is a conjugated diene homopolymer wherein the conjugated diene is selected from the group consisting of 1,3-butadiene and isoprene.

9. The tread composition according to claim 3 wherein said filler is calcium carbonate, iron oxide, carbon black, silica, calcium silicate, or alumina.

10. The tread composition according to claim 9 further incorporating a dye or pigment.

11. The tread composition according to claim 9 wherein said filler comprises carbon black, and wherein said rubber is a polybutadiene, polyisoprene, or a butadiene/or isoprene/styrene copolymer.

12. The tread composition according to claim 3 wherein said extent of epoxidation is in the range of about 10 to 50 percent.

13. A tire having as at least the tread portion thereof the cured composition of claim 3 wherein said epoxidized diene rubber is a sulfur cured epoxidized synthetic conjugated diene rubber.

14. The tire according to claim 13 characterized as a pneumatic tire.

15. The tread composition according to claim 3 wherein said molecular weight is in the range of about 75,000 to 300,000.

16. A tire tread stock exhibiting wet skid resistance when cured, consisting of about 100 parts by weight of a rubber, about 40 to 120 parts by weight filler, about 5 to 80 parts by weight extender oil, and a sulfur-based curing system,
wherein said rubber consists of at least one conjugated diene rubber exhibiting, prior to curing, a molecular weight in the range of about 50,000 to 500,000, an average extent of epoxidation in the range of about 5 to 95 percent of olefinically unsaturated sites in the conjugated diene rubber, and is a homopolymer or copolymer of a conjugated diene alone or with a monovinylarene.

17. The tire tread composition according to claim 16 wherein said epoxidized diene rubber prior to curing exhibits an extent of epoxidation in the range of about 10 to 50 percent, said filler is carbon black in the range of about 50 to 90 parts by weight, and said extender oil in the range of about 8 to 50 weight percent.

18. The tire tread composition according to claim 17 wherein said epoxidized diene rubber is a solution-polymerized 75/25 butadiene/styrene random copolymer.

19. A tread stock, exhibiting wet skid resistance when cured, consisting of about 100 parts by weight of a rubber, about 40 to 120 parts by weight carbon black, about 5 to 80 parts by weight extender oil, a sulfur-based curing system, optionally a pigment,
wherein said rubber is a conjugated diene rubbery exhibiting, prior to curing, a molecular weight in the range of about 50,000 to 500,000, an average extent of epoxidation in the range of about 5 to 95 percent of olefinically unsaturated sites in the conjugated diene rubber.

20. The tread composition according to claim 19 wherein said epoxidized diene rubber prior to curing exhibits an extent of epoxidation in the range of about 10 to 50 percent, wherein said filler is carbon black and is in the range of about 50 to 90 parts by weight, and said extender oil in the range of about 8 to 50 weight percent.

21. The tread composition according to claim 20 wherein said epoxidized diene rubber is a solution-polymerized 75/25 butadiene/styrene random copolymer.

22. The tread stock of claim 19 employing about 0.1 to 5 weight percent sulfur based on the diene rubber.

23. A tire having as the tread portion thereof the cured stock of claim 16.

24. A tire having as the tread portion thereof the cured stock of claim 19.

25. A tire tread stock, exhibiting wet skid resistance when cured, consisting of:

| | |
|---|---|
| polymer | 100 parts by weight |
| carbon black | 40–120 parts by weight |
| extender oil | 5–80 parts by weight |
| sulfur | 1–3 parts by weight |
| activator | 1–8 parts by weight |
| accelerator | 0.5–1.5 parts by weight |
| secondary accelerator | 0–0.5 parts by weight |
| antioxidant/antiozonant | 1–3 parts by weight |
| processing aids | 0–5 parts by weight | wherein said polymer consists of conjugated diene rubber exhibiting, prior to curing, a molecular weight in the range of about 50,000 to 500,000, an average extent of epoxidation in the range of about 5 to 95 percent of olefinically unsaturated sites in the conjugated diene rubber, and which is a homopolymer of a conjugated diene or a copolymer of a conjugated diene with a monovinylarene;

wherein said activator is selected from the group consisting of stearic acid, zinc stearate, and mixtures thereof;

said accelerator is selected from the group consisting of 2-mercaptobenzothiazole, and N-cyclohexyl-2-benzothiazoylsulfenamide;

said secondary accelerator were employed is selected from the group consisting of diphenylguanidine and tetramethylthiuramdisulfide;

said antioxidant/antiozonant is selected from the group consisting of phenyl-$\beta$-naphthylamine, diarylamineketone reaction product, N,N'-diphenyl-p-phenylenediamine, alkylated phenols, and phosphites; and said processing aids were employed are selected from waxes.

* * * * *